(12) United States Patent
Liu et al.

(10) Patent No.: US 9,096,387 B2
(45) Date of Patent: Aug. 4, 2015

(54) POSITIONING MECHANISM

(75) Inventors: Dong-Cheng Liu, Shenzhen (CN); Kun Chen, Shenzhen (CN); Ya-Juan Xiao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 637 days.

(21) Appl. No.: 13/400,820

(22) Filed: Feb. 21, 2012

(65) Prior Publication Data

US 2013/0071200 A1 Mar. 21, 2013

(30) Foreign Application Priority Data

Sep. 15, 2011 (CN) .......................... 2011 1 0273320

(51) Int. Cl.
*B65G 69/00* (2006.01)
*B65G 47/00* (2006.01)
*B65G 65/00* (2006.01)

(52) U.S. Cl.
CPC .............. *B65G 47/00* (2013.01); *B65G 69/003* (2013.01); *B65G 69/006* (2013.01); *B65G 65/00* (2013.01)

(58) Field of Classification Search
CPC ............................ B65G 69/003; B65G 69/006
USPC .................................................. 414/396, 401
See application file for complete search history.

(56) References Cited

U.S. PATENT DOCUMENTS

| 4,746,258 | A | * | 5/1988 | Loomer et al. ................. 414/401 |
| 4,818,171 | A | * | 4/1989 | Burkholder ................... 414/497 |
| 4,861,220 | A | * | 8/1989 | Smith ............................ 414/495 |
| 4,893,963 | A | * | 1/1990 | Le Goff ...................... 403/322.3 |
| 4,915,569 | A | * | 4/1990 | Cherko ........................ 414/401 |
| 4,940,378 | A | * | 7/1990 | Feldmann et al. ............ 414/401 |
| 5,306,109 | A | * | 4/1994 | Kreuzer et al. ............... 414/343 |
| 5,354,153 | A | * | 10/1994 | Ottone et al. ................. 408/1 R |
| 5,451,133 | A | * | 9/1995 | Salsburg et al. .............. 414/401 |
| 5,641,260 | A | * | 6/1997 | Gray ............................ 414/401 |
| 6,231,292 | B1 | * | 5/2001 | Wyssmuller et al. ..... 414/331.07 |
| 6,394,743 | B1 | * | 5/2002 | Marsden et al. .............. 414/809 |
| 6,454,512 | B1 | * | 9/2002 | Weiss ........................... 414/663 |

\* cited by examiner

*Primary Examiner* — James Keenan
(74) *Attorney, Agent, or Firm* — Novak Druce Connolly Bove + Quigg LLP

(57) ABSTRACT

A positioning mechanism, used for positioning a material being transported, includes a loading assembly and a positioning assembly. The loading assembly includes a fixing member and a loading member movably fixed to the fixing member for loading the material. The positioning assembly includes a first engaging member mounted on the loading member, and a second engaging member engaged with the first engaging member. The second engaging member includes a mounting plate and a locking rod mounted on the mounting plate. The mounting plate is located beside a predetermined position. The first engaging member defines a connecting portion. The second engaging member includes a locking rod. The locking rod forms a latching end, and the latching end is tapered outwardly along the axis of the locking rod. The latching end engages with the connecting portion to position the loading member to the predetermined position.

14 Claims, 3 Drawing Sheets

POSITIONING MECHANISM

BACKGROUND

1. Technical Field

The present disclosure relates to positioning mechanisms, particularly to a positioning mechanism for positioning materials after the materials are transported.

2. Description of Related Art

Carrier vehicles are usually used to transport materials, for example, the automated guided vehicle (AVG) is a carrier vehicle. When the materials are transported to a predetermined position at a particular location, the materials are usually clamped and taken away ready for a next procedure. However, the carrier vehicle often cannot position the materials precisely, and this result in the failure of clamping of the materials during transport.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
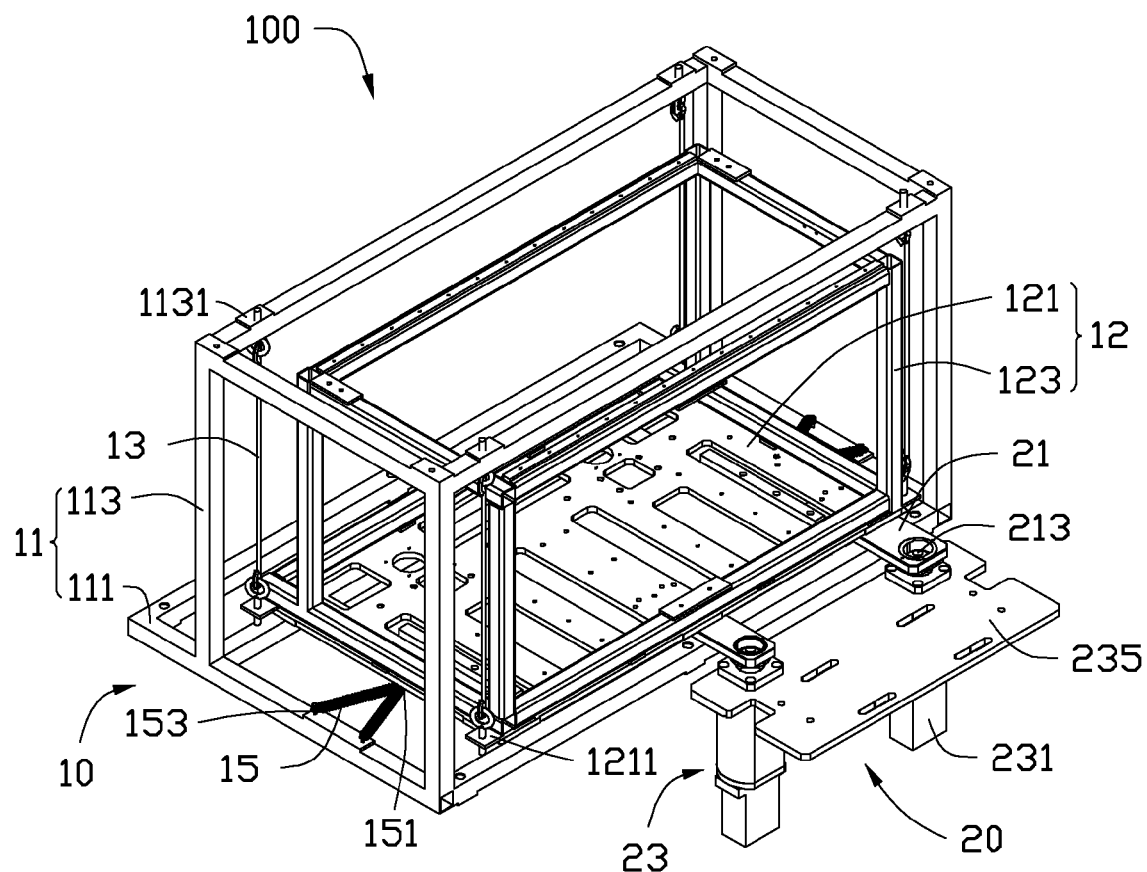
FIG. 1 is an isometric view of an embodiment of a positioning mechanism.
Figure 2:
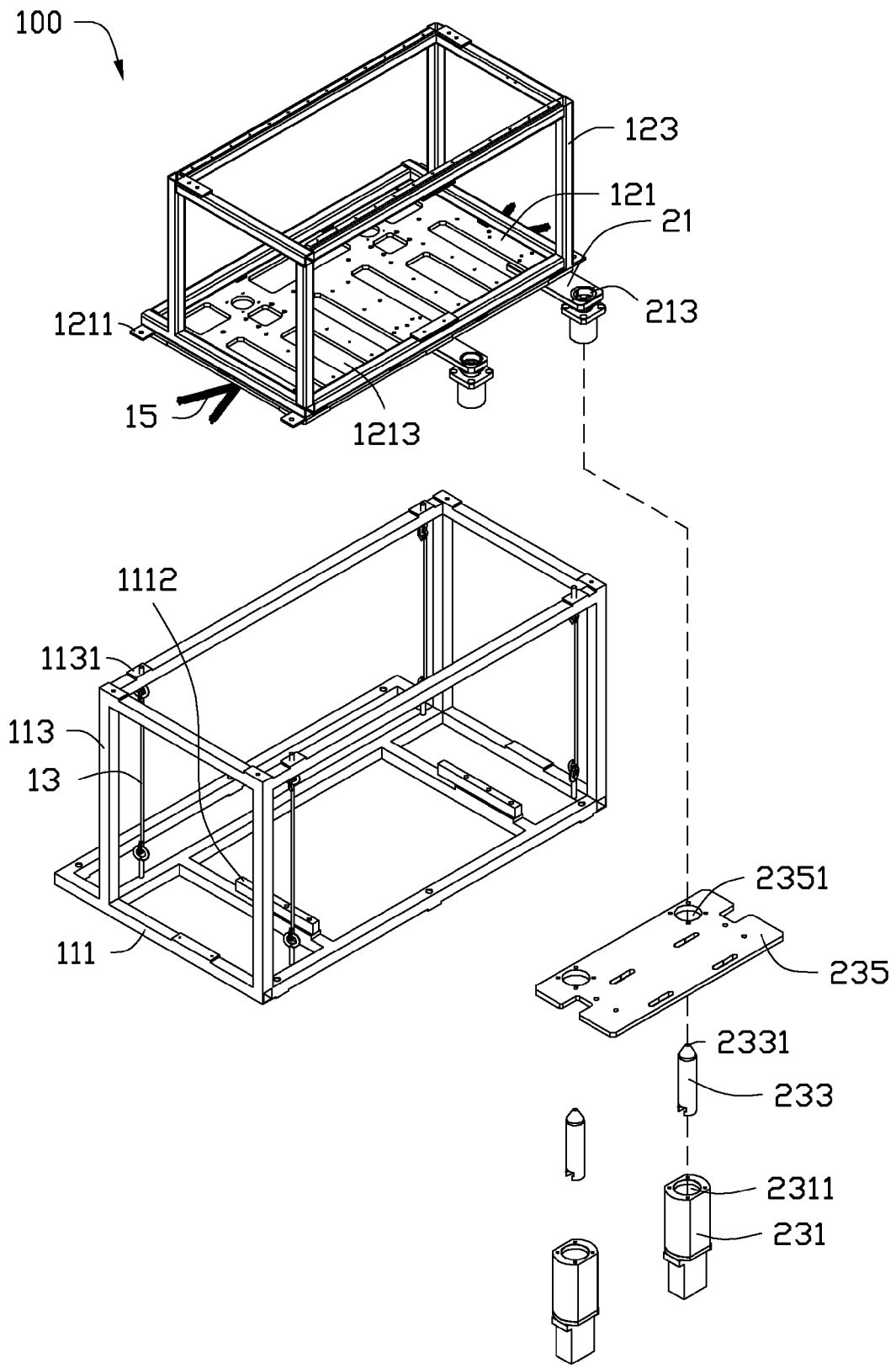
FIG. 2 is an exploded, isometric view of the positioning mechanism shown in FIG. 1.

Referring to FIGS. 1 and 2, an embodiment of a positioning mechanism 100, for positioning a plurality of materials therein, includes a loading assembly 10 and a positioning assembly 20 configured and engaged with the loading assembly 10. The loading assembly 10 is capable of bearing the weight of the materials. The positioning assembly 20 is capable of positioning the materials on the loading assembly 10.

The loading assembly 10 includes a fixing member 11, a loading member 12, a group of hanging members 13, and a pair of elastic members 15. The loading member 12 is provided to contain the materials therein. The loading member 12 is hung in the fixing member 11 via the hanging members 13. The elastic members 15 interconnect the fixing member 11 and the loading member 12 at the opposite side of the loading member 12, respectively, for limiting the shaking amplitude of the loading member 12.

The fixing member 11 includes a fixing platform 111 and a fixing frame 113 extending substantially perpendicularly from the fixing platform 111. The fixing platform 111 forms a pair of protruding portions 1112 on a surface thereof towards the fixing frame 113, and the protruding portions 1112 extend substantially perpendicularly outward. The protruding portions 1112 are a plurality of blocks, and are arranged apart and parallel to each other. In the illustrated embodiment, the fixing platform 111 is substantially a rectangular frame, and formed by a plurality of rods connected together. It is can be understood that, the fixing platform 111 can be a planar plate.

The fixing frame 113 is substantially a cuboid frame, and the bottom of the fixing frame 113 is connected to the fixing platform 111. The fixing frame 113 forms a group of fixing portions 1131 at the side away from the fixing platform 111, for fixing an end of the hanging members 13. The number of the fixing portions 1131 is equal to the number of the hanging members 13. In the illustrated embodiment, the number of the fixing portions 1131 is four, and the four fixing portions 1131 are respectively positioned on the four corners of the fixing frame 113.

The loading member 12 includes a supporting plate 121 and a shielding frame 123 extending substantially perpendicularly from the supporting plate 121. The supporting plate 121 is substantially a rectangular plate, and the size thereof is smaller than the size of the fixing platform 111. The supporting plate 121 forms four securing portions 1211 extending from the opposite sides thereof corresponding to the positions of the four fixing portions 1131, respectively. The supporting plate 121 defines a pair of latching portions 1213 corresponding to the protruding portions 1112. The latching portions 1213 are a plurality of substantially strip holes, and are latched with the protruding portions 1112 to position the supporting plate 121.

The shielding frame 123 is substantially a cuboid frame, and the bottom of the shielding frame 123 is connected to the supporting plate 121. In the illustrated embodiment, the shape of the shielding frame 123 is substantially similar to the shape of the fixing frame 113, and the size of the shielding frame 123 is smaller than the size of the fixing frame 113.

In the illustrated embodiment, the number of the hanging members 13 is four. The hanging members 13 are steel wires. Each hanging member 13 is fixed with the fixing portion 1131 and the corresponding securing portion 1211 at the opposite distal ends thereof, for hanging the loading member 12 in the fixing frame 113. The length of the hanging members 13 is shorter than the height of the fixing frame 113, and the length of the hanging member 13 in addition to the height of the protruding portion 1112 is greater than the height of the fixing frame 113, for allowing the protruding portion 1112 to latch with the latching portion 1213 when the loading member 12 is hung by the hanging members 13.

In the illustrated embodiment, the elastic members 15 are a plurality of springs, and the number of the elastic members 15 is two. Each elastic member 15 is bent at the middle thereof to form a V-shape, and the elastic member 15 includes a bending end 151 at the bending position and a pair of connecting ends 153 at the two free ends thereof. The bending ends 151 are fixed on the opposite sides of the supporting plate 121 at the middle of the sides thereof, and the two pairs of the connecting ends 153 are fixed on the opposite sides of the fixing platform 111 near the bending ends 151, for balancing the force subjected by the shaking of the loading member 12.

The positioning assembly 20 includes a pair of first engaging members 21 and a second engaging member 23 engaged with the first engaging members 21. The first engaging members 21 are arranged apart on a side next to the securing portions 1211 of the supporting plate 121. The first engaging members 21 are substantially sheets, and substantially perpendicularly extending away from the supporting plate 121. Each first engaging member 21 defines a connecting portion 213 at an end thereof away from the supporting plate 121. In the illustrated embodiment, the connecting portion 213 of one of the first engaging member 21 is a circular through hole, and the connecting portion 213 of another first engaging member 21 is a slotted hole. It can be understood that, the number of the first engaging member 21 can be one or more. The connecting portion 213 can be of other shapes, such as a rectangular hole.

The second engaging member 23 includes a pair of cylindrical portions 231, a pair of locking rods 233 mounted in the cylindrical portions 231, and a mounting plate 235 on which the cylindrical portions 231 are mounted. The mounting plate 235 is substantially a planar plate, and defines a pair of through holes 2351 near the edge thereof. The distance or diameter of the through holes 2351 is equal to the distance or diameter of the connecting portions 213. In the illustrated embodiment, the through holes 2351 are circular holes.

Each cylindrical portion 231 defines a receiving hole 2311 along the center axis, and is fixed on the mounting plate 235 with the receiving hole 2311 overlapping the through hole 2351. The locking rods 233 are received in the receiving holes 2311, and capable of extending through the through holes 2351 driven by the cylindrical portion 231. The size of each locking rod 233 is corresponding to the size of the connecting portion 213, and the locking rod 233 includes a latching end 2331 at the distal end thereof towards the through hole 2351 corresponding to the connecting portion 213. The latching end 2331 is substantially conic, for easily passing through the through hole 2351.

In assembly, first, the loading member 12 is put into the fixing frame 113, and the supporting plate 121 faces the fixing platform 111. The protruding portions 1112 are latched with the latching portions 1213. Second, an end of each hanging member 13 is fixed to the fixing portion 1131, and the opposite end thereof is fixed to the securing portion 1211 corresponding to the fixing portion 1131, thus the loading member 12 hangs in the fixing member 11. The bending ends 151 of the elastic members 15 are mounted on the opposite sides of the supporting plate 121, and the pairs of the connecting ends 153 are mounted on the corresponding side of the fixing platform 111. The distances of the bending end 151 to each connecting end 153 of each elastic member 15 are the same. Third, the first engaging members 21 are fixed on the side next to the securing portion 1211 of the supporting plate 121, and the connecting portions 213 are away from the supporting plate 121. Fourth, the locking rods 233 are mounted in the receiving holes 2311 of the cylindrical portions 231. The cylindrical portions 231 are substantially perpendicularly mounted on the mounting plate 235 by engaging with a pair of flanges (not labeled in FIGS. 1 to 3).

Figure 3:
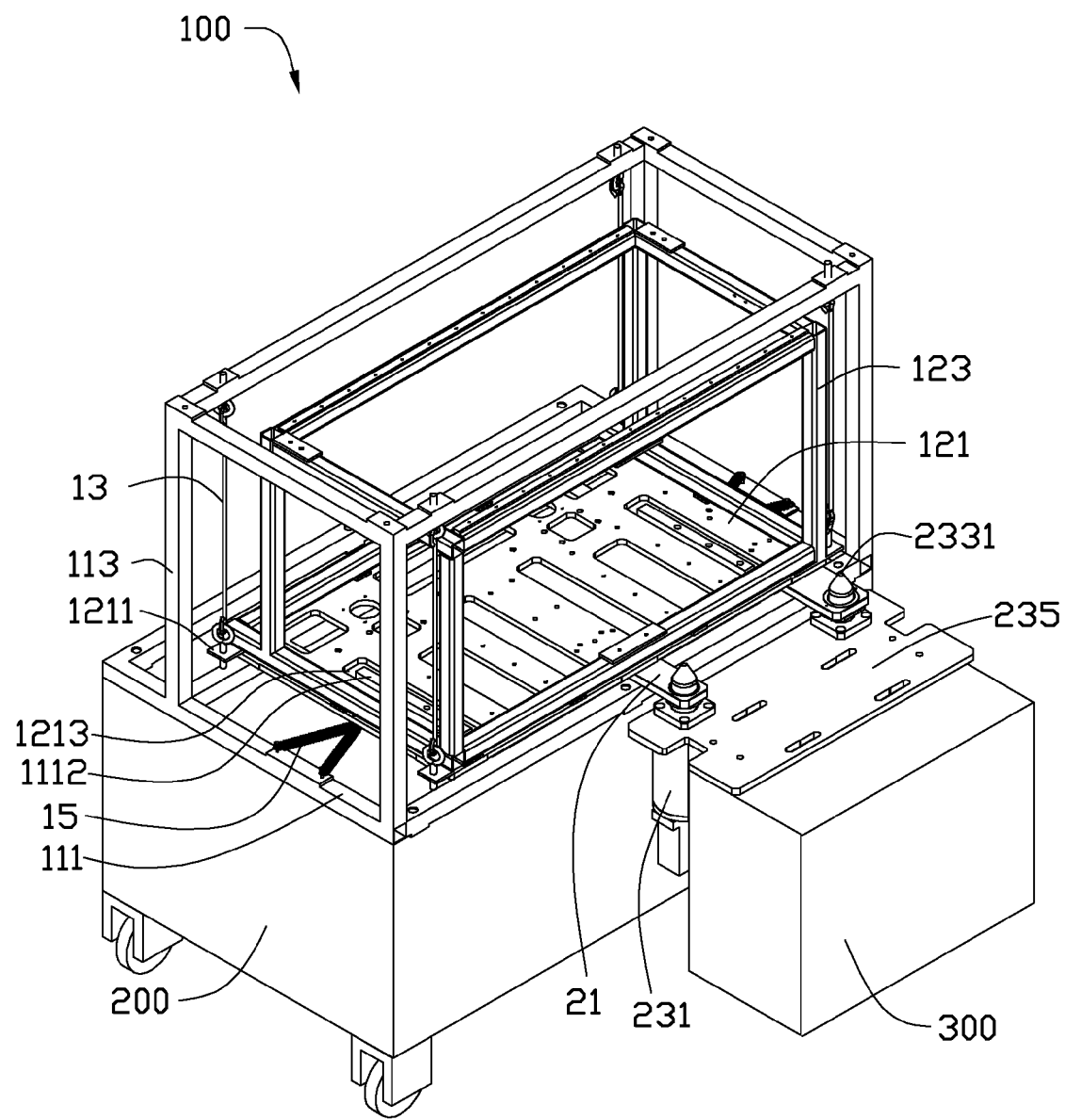
FIG. 3 is an isometric view of a working state of the positioning mechanism shown in FIG. 1.

Also referring to FIG. 3, in use, the loading assembly 10 is placed on a carrier vehicle 200, and the fixing platform 111 is fixed on the carrier vehicle 200. At this time, the fixing frame 113 and the loading member 12 are substantially perpendicular to the carrier vehicle 200. A plurality of materials (not shown) are placed on the supporting plate 121, and transported by the carrier vehicle 200. Because the loading member 12 is hung in the fixing member 11, the loading member 12 would shake when the carrier vehicle 200 is moving. Because the protruding portions 1112 are latched with the latching portions 1213, the shaking amplitude of the loading member 12 is thereby decreased. Because the elastic members 15 interconnect the supporting plate 121 with the fixing platform 111 at the symmetrical sides, the speed of shaking of the loading member 12 is slowed down, and the shaking amplitude of the loading member 12 is further decreased. Thus, the materials are steadily transported. Furthermore, the shielding frame 123 can protect the materials from falling off.

The mounting plate 235 is fixed onto a fixing box 300 located beside a predetermined position by fasteners (not shown), and ensuring that the cylindrical portions 231 are perpendicular to the horizontal plane, thus the second engaging member 23 is fixed on the fixing box 300. At this moment, the locking rods 233 are received in the receiving holes 2311. The predetermined position is the position of the materials to be processed after transporting. In the illustrated embodiment, the materials are transported to a clamping position to be clamped by a robot arm (not shown). The predetermined position is the clamping position.

When the materials are carried to the clamping position, the carrier vehicle 200 is stopped, and the connecting portions 213 are almost aligned with the through holes 2351. Because the carrier vehicle 200 cannot position the loading member 12 precisely, the materials are located on an adjacent position near the clamping position. Thus, the locking rods 233 received in the receiving holes 2311 are imprecisely aligned with the connecting portions 213.

The cylindrical portions 231 drive the locking rods 233 to pass through the through holes 2351 to lock with the connecting portions 213, thus the first engaging members 21 are pushed by the locking rods 233 to make sure the connecting portions 213 are precisely aligned with the through holes 2351. Because the first engaging members 21 are moved and the shielding frame 123 is hanging in the fixing frame 113, the loading member 12 is moved after the moving of the first engaging member 21. Thus the materials placed in the loading member 12 are positioned to the clamping position. After positioning, the robot arm clamps the materials from the loading member 12. After clamping, the cylindrical portions 231 drive the locking rods 233 to retract to the receiving holes 2311, so that the locking rods 233 unlock from the connecting portions 213. Then, the carrier vehicle 200 moves to carry more materials.

It is noted that, besides the loading member 12, there can be other ways to move relative to the fixing platform 111, such as, a sliding member (for example, a sliding wheel or a rolling wheel or a plurality of rolling balls) is mounted between the fixing platform 111 and the supporting plate 121 to make the loading member 12 movable. Thus the fixing frame 113 can be omitted. The fixing platform 111 can be a planar surface of the carrier vehicle 200. The hanging member 13 can be in the form of other high intensity wires, such as suspension rope. The elastic members 15 can be replaced by other materials, such as rubber bands. The latching end 2331 can be of other shape of being tapered outwardly along the axis of the locking rod 233, such as paraboloidal body.

The elastic members 15 are bent at the middle, and the bending ends 151 are fixed on the supporting plate 121, the pairs of connecting ends 153 are fixed on the supporting platform 111, thus the elastic members 15 is stressed evenly. Since the protruding portions 1112 are latched with the latching portions 1213, and the elastic members 15 interconnect the supporting platform 111 with the supporting plate 121, the supporting plate 121 is steadily transported on the carrier vehicle 200. Since the supporting plate 121 moves easily relative to the supporting platform 111, the locking rods 233 extend to latch with the connecting portions 213, and push the first engaging members 21 and the loading member 12 to move to the clamping position, thus the materials are positioned to the clamping position precisely.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A positioning mechanism, used for positioning a material being transported, comprising:
   a loading assembly comprising:

a fixing member comprising a fixing platform and a fixing frame perpendicularly extending from the fixing platform, the fixing platform forms a protruding portion, a group of hanging members, and a loading member hung in the fixing frame via the hanging members for loading the material, the loading member comprising a supporting plate, the supporting plate defining a latching portion; the protruding portion latching with the latching portion, a length of the hanging member in addition to a height of the protruding portion being greater than a height of the fixing frame; and a positioning assembly comprising a first engaging member mounted on the loading member, and a second engaging member engaged with the first engaging member;

wherein the second engaging member comprises a mounting plate and a locking rod mounted on the mounting plate; the mounting plate is located beside a predetermined position; the first engaging member defines a connecting portion; the locking rod forms a latching end, and the latching end is tapered outwardly along the axis of the locking rod; and the latching end engages with the connecting portion to position the loading member to the predetermined position.

2. The positioning mechanism of claim 1, wherein the second engaging member further comprises a cylindrical portion mounted on the mounting plate; the locking rod is mounted in the cylindrical portion, and is driven by the cylindrical portion to lock with the connecting portion.

3. The positioning mechanism of claim 2, wherein the mounting plate defines a through hole; the cylindrical portion defines a receiving hole along the axis overlapping the through hole; the locking rod is received in the receiving hole and extended to pass through the through hole driven by the cylindrical portion.

4. The positioning mechanism of claim 3, wherein the connecting portion is a through hole; a size of the locking rod is corresponding to a size of the connecting portion.

5. The positioning mechanism of claim 1, wherein the fixing frame forms a group of fixing portions at the side away from the fixing platform; the supporting plate forms a group of securing portions; each hanging member is fixed with the corresponding fixing portion and the securing portion at opposite distal ends thereof.

6. The positioning mechanism of claim 5, wherein the loading assembly further comprises a pair of elastic members; the elastic members interconnect the supporting plate with the fixing platform at the symmetrical sides.

7. The positioning mechanism of claim 6, wherein each elastic member is bent at the middle, comprises a bending end at the bending position and a pair of connecting ends at the free ends thereof; the bending end is fixed on a side of the supporting plate at the middle; the connecting ends are fixed on a side of the fixing platform near to the bending end.

8. The positioning mechanism of claim 1, wherein the hanging members are steel wires.

9. A positioning mechanism, used for positioning a material being transported, comprising:

a loading assembly comprising:

a fixing member comprising a fixing platform and a fixing frame perpendicularly extending from the fixing platform, the fixing platform forms a protruding portion, a group of hanging members, and a loading member hung in the fixing frame via the hanging members for loading the material, the loading member comprising a supporting plate, the supporting plate defining a latching portion; the protruding portion latching with the latching portion, a length of the hanging member in addition to a height of the protruding portion being greater than a height of the fixing frame; and a positioning assembly comprising a pair of first engaging members mounted on the loading member, and a second engaging member engaged with the first engaging members;

wherein the second engaging member comprises a mounting plate and a pair of locking rods mounted on the mounting plate; the mounting plate is located beside a predetermined position; each first engaging member defines a connecting portion; each locking rod forms a latching end, and the latching end is tapered outwardly along the axis of the locking rod; and the locking rods engage with the connecting portions to position the loading member to the predetermined position.

10. The positioning mechanism of claim 9, wherein the second engaging member further comprises a pair of cylindrical portions mounted on the mounting plate; the locking rods are mounted in the cylindrical portions, and are driven by the cylindrical portions to lock with the connecting portions.

11. The positioning mechanism of claim 10, wherein the mounting plate defines a pair of through holes; each cylindrical portion defines a receiving hole along the axis overlapping the through hole; the locking rods are received in the receiving holes and extended to pass through the through holes driven by the cylindrical portions.

12. The positioning mechanism of claim 11, wherein the one of the connecting portion is a through hole, and another one of the connecting portion is a slotted hole; a size of the locking rods is corresponding to a size of the connecting portions.

13. The positioning mechanism of claim 9, wherein the loading assembly further comprises a pair of elastic members; the elastic members interconnect the supporting plate with the fixing platform at the symmetrical sides.

14. The positioning mechanism of claim 13, wherein each elastic member is bent at the middle, comprises a bending end at the bending position and a pair of connecting ends at the free ends thereof; the bending end is fixed on a side of the supporting plate at the middle; the connecting ends are fixed on a side of the fixing platform near to the bending end.

* * * * *